(12) United States Patent
Wu et al.

(10) Patent No.: US 9,558,273 B2
(45) Date of Patent: Jan. 31, 2017

(54) SYSTEM AND METHOD FOR GENERATING INFLUENCER SCORES

(71) Applicant: Appinions Inc., New York, NY (US)

(72) Inventors: Chia-Wei Wu, New Taipei (TW); Claire Cardie, Ithaca, NY (US); Laurence Levy, Scarsdale, NY (US); Shaomei Wu, Berkeley, CA (US); Vladimir Dmitrievich Barash, Somerville, MA (US); David Rusell Pierce, Irvington, NY (US)

(73) Assignee: Appinions Inc., New York, NY (US)

( * ) Notice: Subject to any disclaimer, the term of this patent is extended or adjusted under 35 U.S.C. 154(b) by 154 days.

(21) Appl. No.: 14/034,402

(22) Filed: Sep. 23, 2013

(65) Prior Publication Data

US 2014/0089323 A1    Mar. 27, 2014

Related U.S. Application Data

(60) Provisional application No. 61/704,269, filed on Sep. 21, 2012.

(51) Int. Cl.
*G06F 17/30* (2006.01)
*G06Q 50/00* (2012.01)

(52) U.S. Cl.
CPC ... *G06F 17/30861* (2013.01); *G06F 17/30867* (2013.01); *G06Q 50/01* (2013.01)

(58) Field of Classification Search
USPC ................................................ 707/705, 748
See application file for complete search history.

(56) References Cited

U.S. PATENT DOCUMENTS

| | | | |
|---|---|---|---|
| 7,185,065 B1* | 2/2007 | Holtzman | G06F 17/2745 705/36 R |
| 7,197,470 B1* | 3/2007 | Arnett | G06F 21/31 705/7.29 |
| 7,523,085 B2* | 4/2009 | Nigam | G06F 17/274 706/55 |
| 7,895,149 B2* | 2/2011 | Merugu | G06N 5/04 706/45 |
| 8,126,876 B2* | 2/2012 | Curtiss | G06F 17/30864 707/706 |
| 2011/0035385 A1* | 2/2011 | Teicher | A63F 13/12 707/748 |
| 2011/0238670 A1* | 9/2011 | Mercuri | G06Q 30/0282 707/748 |
| 2012/0197903 A1* | 8/2012 | Lu | G06Q 30/02 707/748 |
| 2012/0203788 A1* | 8/2012 | Magyar | H04L 41/5009 707/748 |

* cited by examiner

*Primary Examiner* — Kim Nguyen
(74) *Attorney, Agent, or Firm* — Dentons US LLP (57) ABSTRACT

Methods and systems for generating influence scores are disclosed. A plurality of opinions of a selected topic are retrieved from a database. Influencers each associated with at least one opinion from the plurality of opinions are determined using the processor. A score is automatically generated for each influencer using the processor, the score related to the selected topic.

48 Claims, 8 Drawing Sheets

SYSTEM AND METHOD FOR GENERATING INFLUENCER SCORES

CROSS REFERENCE TO RELATED APPLICATIONS

The present application claims the benefit of U.S. Provisional Application Ser. No. 61/704,269, filed on 21 Sep. 2012, which is incorporated herein by reference in its entirety.

FIELD

The present disclosure relates to methods and systems for generating influence scores. More particularly, the present disclosure relates to an influence engine that collects opinions from influencers and calculates influence scores indicative of the influence of the particular influencer on a particular topic.

BACKGROUND OF THE INVENTION

With the explosion on the internet of news outlets, social network sites including Facebook and Twitter, and personal platforms such as blogs, it has become increasingly difficult to track all the narratives, conversations, and interactions proffered by these data sources. The overwhelming amount of sources of information and chatter provided by the aforementioned sources such as Facebook, Twitter, and blogs necessitates the identification of influencers and the determination of exactly how much influence their actions may have on the public at large for a variety of topics. An influencer may be any individual who interacts with other individuals in the context of a conversation—including publishers, authors, broadcasters, persons, organizations, bloggers, commenters, and social media users generating or participating in such conversations. President Obama's influence may arise by virtue of quotations in news media, mentions in blogs, and content generated by his @BarackObama twitter account. However, it is too time consuming to manually wade through all of the conversations to attempt to determine which participants and sources are most highly influential. A more efficient solution is therefore needed to determine influence levels of influencers.

SUMMARY

The present disclosure relates to methods and systems for generating influence scores. More particularly, the present disclosure relates to an influence engine that collects data from influencers and calculates influence scores indicative of the influence of the particular influencer on a particular topic. An influencer is scored based on the interactions with those individuals he has influenced on the given topic. When an individual exerts influence across multiple networks of interaction, the scores are combined based on equivalence relations embodied by a mapping service. For example, the named entity Barack Obama might be influential in news articles, while user @BarackObama might be influential in Twitter. When the mapping service indicates that these personas represent the same individual, the scores are combined to yield a single composite influencer.

A mapping service in accordance with the embodiments described herein may be an automatic system identifying influencers as the same entities. For example, Barack Obama may be an influencer extracted from News article and @BarackObama may be an influencer based on a Twitter handle. A mapping service identifies both influencers as the same entity (common influencer). The influencer engine will calculate one unified influence score for Barack Obama based on the foregoing. Each influencer is an entity, and each entity may have different names existing in different or the same data sources.

In an embodiment, a method for determining influence scores is disclosed. Opinions of a selected topic are retrieved. Influencers, each associated with at least one opinion on the selected topic, are determined based on at least one parameter. A score is generated for each influencer with respect to the selected topic.

In another embodiment, retrieving opinions of a selected topic comprises extracting opinions from data sources. The data sources may comprise at least one of: news sites, blogs, forums, transcripts, tweets, comments, quotes, and social network entries.

In another embodiment, determining influencers comprises: analyzing the opinions to determine those associated with at least one influencer, and associating the opinions of the at least one influencer with a common influencer.

In another embodiment, generating a score for each influencer comprises: determining interactions by each influencer with other entities; calculating an interaction factor for each influencer based on the interactions; and generating the score for each influencer based on the calculated interaction factor.

In another embodiment, the score is based on a weighted score of each influencer with respect to a data source.

In another embodiment, the selected topic including a set of constraints is received.

In another embodiment, a list of influencers including the corresponding score of each influencer with respect to the selected topic is provided.

In an embodiment, a system for determining influence scores is disclosed. The system may comprise an influence engine. The influence engine comprises an opinion unit configured for retrieving opinions on a selected topic; an influencer mapping unit configured for determining influencers each associated with at least one opinion based on at least one threshold parameter and a score generation unit configured for generating a score for each influencer, the score related to the selected topic.

In another embodiment, the system further comprises an opinion extraction engine configured for extracting opinions from data sources, wherein the extracted opinions may be provided to the opinion unit. The data sources may comprise at least one of: new sites, blogs, tweets, comments, quotes, transcripts, and social network entries.

In another embodiment, the influencer mapping unit is further configured for: analyzing the opinions to determine those associated with at least one influencer, and associating the opinions of the at least one influencer with a common influencer.

In another embodiment, the score generation unit is further configured for determining interactions by each influencer with other entities; calculating an interaction factor for each influencer based on the interactions; and generating the score for each influencer based on the calculated interaction factor.

In another embodiment, the score is based on the weighted score of each influencer with respect to a data source.

In another embodiment, the system comprises a user interface unit configured for receiving the selected topic including a set of constraints.

In another embodiment, the system comprises a user interface unit configured for providing a list of each influencer along with the corresponding score of each influencer with respect to the selected topic.

In an embodiment, a machine-readable non-transitory and tangible medium having information recorded thereon for generating influence scores is disclosed. The information, when read by the machine, causes the machine to perform the steps comprising: retrieving opinions of a selected topic; determining influencers each associated with at least one opinion based on at last one threshold parameter; and generating a score for each influencer, the score related to the selected topic and generated according to the algorithm or formula recorded on the supplied medium.

In another embodiment, retrieving opinions of a selected topic comprises extracting opinions from data sources. The data sources may comprise at least one of: news sites, blogs, forums, transcripts, tweets, comments, quotes, and social network entries.

In another embodiment, determining influencers comprises: analyzing the opinions to determine those associated with an influencer, identifying at least two influencers that are the same entity; and associating the opinions of the at least two influencers with a common influencer that represents the at least two influencers.

In another embodiment, determining influencers comprises: analyzing the opinions to determine those associated with at least one influencer, and associating the opinions of the at least one influencer with a common influencer.

In another embodiment, generating a score for each influencer comprises: determining interactions by each influencer with other entities; calculating an interaction factor for each influencer based on the interactions; and generating the score for each influencer based on the calculated interaction factor.

In another embodiment, the score is based on a weighted score of each influencer with respect to a data source.

In another embodiment, the selected topic including a set of constraints is received.

In another embodiment, a list of each influencer including the corresponding score of each influencer with respect to the selected topic is provided.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

BRIEF DESCRIPTION OF THE DRAWINGS

The exemplary embodiments described herein may be described in detail with reference to the drawings. These embodiments are non-limiting exemplary embodiments, in which like reference numerals represent similar structures throughout the several views of the drawings.

DETAILED DESCRIPTION

The present disclosure and embodiments described herein provide a system that determines influencers and calculates an influence score for each influencer based on a given set of opinions associated with each influencer. An influencer may be defined as one who holds an opinion or gives an opinion. For example, an influencer may be a celebrity who has given their opinion on the state of innovation in the United States, where the opinion is published by a news website. Opinions used as the basis for calculating influence scores are selected based on a topic that may be predetermined or selected, and query or topic constraints. The topic may represent any topic of interest, such as consumer goods, political issues, current events issues, brands, and other topics that may be of interest due to a high number of opinions by various individuals or entities. The query constraints may be, for example, keywords that define the topic. If a topic is, for example, "dipping sauces", the topic may be further refined by a query constraint such as a particular brand name that sells or manufactures dipping sauces.

The opinions themselves are extracted by an opinion extraction engine which is responsible for retrieving content from data sources, such as news sites, blogs, forums, transcripts, tweets, comments, quotes, and social network entries, and any other archived content on the Internet that may include opinions. The opinion extraction engine analyzes the data sources and extracts opinions from the data sources, as well as assigning attributes to the opinions. The opinion attributes may include, for example, an opinion holder, an author, a publisher, and a publish date. For example, for a particular data source, an opinion holder or influencer may be President Obama, an author may be a newspaper editor, a publisher may be the newspaper, such as the New York Times, and the publish date indicates the date of publication. In a tweet, an opinion holder may be a twitter username whose opinion is mentioned or retweeted.

Each influencer's influence is measured across data sources. Thus, a single influencer's influence score is based on a sum or a weighted sum of their influence scores for each data source. For example, if opinions for an influencer are found on multiple data sources, such as multiple news websites, a blog, and tweets, the influence score for that influencer will be based on subscores for each of the individual data sources. Furthermore, an influencer mapping system automatically merges the scores for influencers which are determined to actually be a single entity or person. If there are two separate scores for, one for President Obama and one for Barack Obama, the system is able to determine that these two people are the same and thus scores for both President Obama and Barack Obama will be automatically combined as the two people or entities are mapped to each other. The influencer mapping feature determines that multiple influencers are actually the same influencer by using contextual attributes such as commonality in names, opinions, dates, related entities, etc. Thus, one unified influence score will be calculated for President Obama and Barack Obama.

Figure 1:
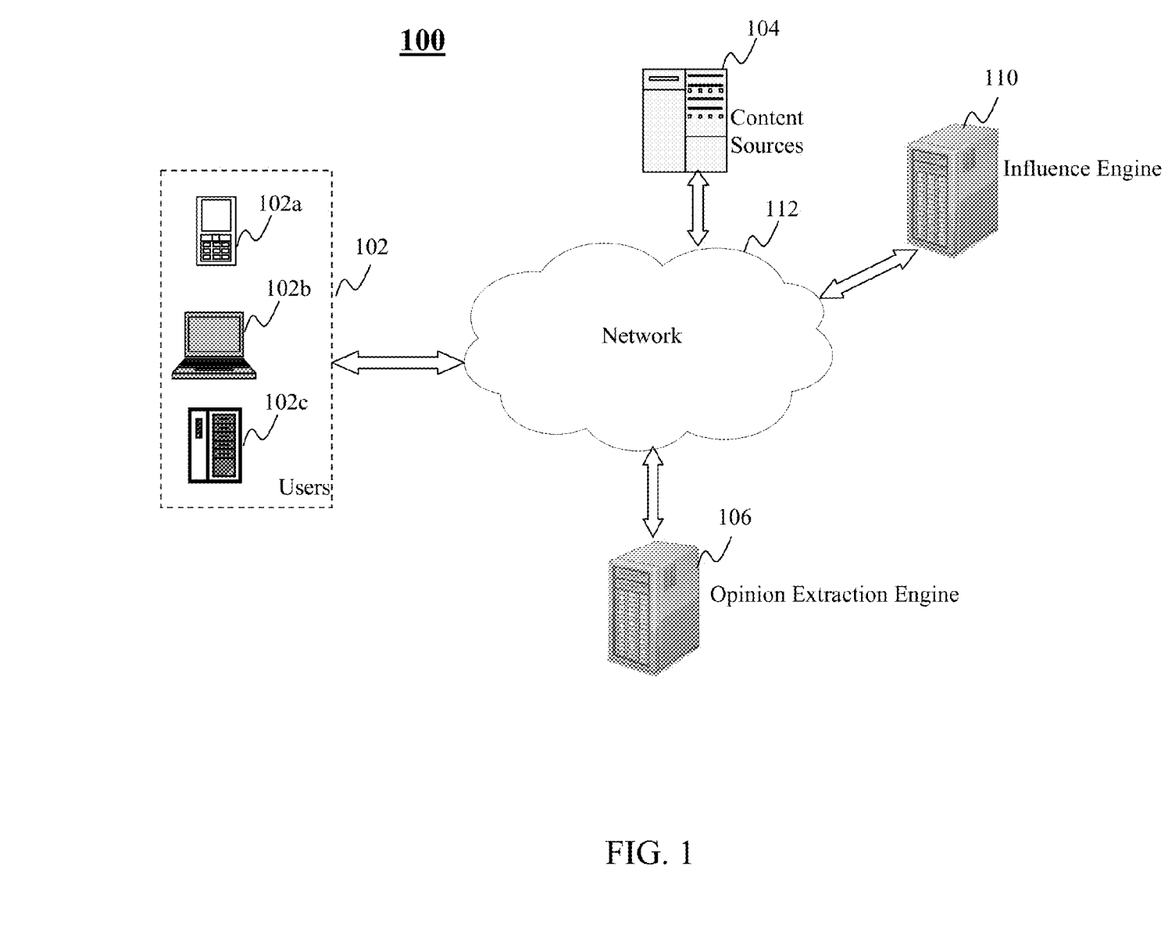
FIG. 1 illustrates an exemplary system for generating influence scores, in accordance with an embodiment of the present disclosure.

FIG. 1 illustrates an exemplary system for generating influence scores, in accordance with an embodiment of the present disclosure. System 100 as shown, includes user devices 102, content or data sources 104, opinion extraction engine 106, and influence engine 110. Communication may take place over network 112. Several user devices 102a, 102b, and 102c are shown to demonstrate that the user device may be a mobile phone, mobile computing device, or a traditional computing device or server based system. Furthermore, a user device may include mobile devices such as smartphones, tablets, and traditional computing devices such as desktop computers. A user device may also comprise any device capable of communication over the Internet through network 112, and thus may be inclusive of vehicles or other equipment or apparatus supporting communication with content sources 104, influence engine 110, or opinion extraction engine 106 through a user interface or without a user interface. Other user devices suitable for use in accordance with the embodiments described herein, although not shown, may also take the place of the user devices shown. While only one influence engine 110 and opinion extraction engine 106 are shown, it is understood that the system may comprise a plurality of influence engines and opinion extraction engines as needed.

Content or data sources 104 includes any data source from which opinion extraction engine 106 retrieves content to extract opinions. Thus, the content sources may include news websites, blog sites, Twitter, social network sites, and any other web based site that may include opinions. Opinion extraction engine 106 retrieves content from content sources 104 and analyzes the content to extract opinions. The extracted opinions may thereafter be provided to influence engine 110.

Influence engine 110 retrieves opinions from opinion extraction engine 106. Opinions may be retrieved based on a user device 102 selecting a topic. Based on this selection, influence engine 110 will retrieve opinions from opinion extraction engine 106 regarding that particular selected topic. The selected topic represents a topic that a user of user device 102 may be interested in. Accompanying the topic selection may also be query constraints, such as keywords which further refine the amount or sources of data from which the opinions may be retrieved.

Influence engine 110 thereafter determines influencers by analyzing the retrieved opinions in an attempt to determine those that are actually associated with an influencer. In the event that at least two influencers are identified that may both represent the same entity or person, the opinions of the at least two influencers are associated. The at least two influencers may thus be designated as a common influencer and all opinions of the at least two influencers may be mapped to the common influencer. As stated in the example above, President Obama and Barack Obama are two influencers that are actually the same entity or person. Thus, influence engine 110, by way of a mapping feature, maps the opinions of President Obama and Barack Obama to either one of the entity names President Obama or Barack Obama.

Determination of influencers may be based upon threshold parameters that dictate how an entity, individual, or opinion holder is qualified or categorized as an influencer. For news sources and blogs, an opinion holder may be deemed an influencer based on whether the opinion holder meets a threshold parameter for number of opinions in a certain time frame. For instance, to be an influencer, the opinion holder must have more than two opinions published in the last two months or 60 days.

For tweets, an influencer may be determined based on having at least one interaction defined as a reply, retweet, or mention. For example, an individual with a first twitter handle may send a tweet that is retweeted or replied to by a second twitter handle. Thus, the second twitter handle is influenced by the first twitter handle and the first twitter handle is deemed an influencer. In the instance of mentions, the influencer is not the one who holds the opinion. Instead, the influencer is determined based on what is mentioned. If a tweet states: I like @Ford's car, Ford is mentioned and is the influencer.

Influence engine 110 generates influence scores by using an algorithm that may produce a number indicative of the influencer. This number is the influence score and represents the amount of influence the influencer has with regard to the selected topic. The influence score may be calculated using variations of the following equation (1):

$$\text{score}(\text{influencer}_k) = \sum_j^{|J|} \text{score}(\text{influencer}_j) * \text{interaction}(k, j) \quad (1)$$

The variable k represents a number associated with a particular influencer. The variable j represents a number associated with an influencer which $\text{influencer}_k$ interacts with. Interaction(k,j) denotes an interaction between $\text{influencer}_k$ and $\text{influencer}_j$. For different data sources, the interaction can be different. For example, in twitter, an interaction may be a retweet, reply, or mention. In news, the interaction may be an opinion quoted in a news article by the author. Influence engine 110 will decide which equation to use by reading the data source of opinions. Thus the influence score for an individual is based upon an interaction factor representing interactions of the influencer with other opinion holders or influencers. The reasoning behind the interaction factor is that interaction with more highly influential individuals yields higher influencer For example, an influencer could have a higher score by virtue of quotation by a prominent publisher or retweet by an influential twitter user.

Influence scores may also be based upon a weighted sub-score of the influencer with respect to a particular data source. Influence engine 110 is aware of all of the data sources from which the opinions were obtained and thus can weigh certain data sources more heavily in calculating influence in the event that a particular data source is more credible, or is experiencing a renaissance period with a rise in viewer ship or subscriptions. Thus, the influence scores may be based on certain factors such as the number of days over which opinions are collected by opinion extraction engine 106, total number of times a publisher has quoted an opinion of an influencer, and readership size of the publisher.

For example, if the data source is news websites or blogs, the influence score may be calculated in a certain manner weighing each data source. In the case of news websites or blogs, the influencer may be defined as one who holds an opinion, an influencee as the publisher, and an interaction as the publisher quoting the opinion holder. For example, in a quote from a New York Times article: "President Obama emphasized the importance of American innovation," the influencer is President Obama, the publisher New York Times, and the interaction between the New York Times and President Obama. An influence score may be calculated using the following equation (2):

$$\text{score}(\text{influencer}_k) = \sum_d^{|D|} \sum_p^{|P|} \sum_{\text{opinion}}^{|\text{opinion}(p,k)|} (\text{tier}_p)/|D| \quad (2)$$

Publisher, as used herein, refers to the publisher of a news website or blog, such as the New York Times, or Huffington Post. Opinions are collected by opinion extraction engine 106 over D days. P denotes a publisher P of a set of publishers. $\text{tier}_p$ represents a publisher P's tier, which is determined based on the publisher's readership size. Six tiers exist, valued from 0 through 5 to represent the influence factor an influencer receives from a publisher tier. A higher value is indicative of a larger readership size. For example, very well known publishers such as ABC and CNN may be in tier 5, and lesser known publishers such as Daily Sports Updates may be in tier 0. opinion(p,k) opinion denotes the set of opinions of influencer$_K$ published by p. Example: Suppose that over the past D days, Barack Obama has 2 opinions about "innovation" published by The New York Times at tier$_{NYT}$ and 1 opinion published by Bob's Politics Blog at tier$_{BPB}$. Then Obama's influence score on "innovation" is (2*tier$_{NYT}$+1*tier$_{BPB}$)/D.

Publisher diversity may also be taken into account in calculating influence scores. The goal of using publisher diversity is to lower influence scores for influencers who are quoted repeatedly by the same single publisher. Thus, equation (2) may be modified and the influence score calculated using the following equation (3):

$$\text{score}(\text{influencer}_k) = \sum_d^{|D|} \sum_p^{|P|} \sum_{\text{opinion}_{i=1}}^{|\text{opinion}(p,k)|} \alpha^{j-1}(\text{tier}_p)/|D| \quad (3)$$

$\alpha^i$ represents a penalty factor for having multiple opinions from any single publisher. We use 0.85 for $\alpha$. For example, if two opinions from the same publisher, then the second opinion will only get 0.85 of the score from first opinion since $0.85^{(2-1)}$ is 0.85.

As another example of how an influence score is calculated, President Obama may have 6 associated opinions published by ABC, New York Times, Yahoo! News, two personal blogs, and a local news website. President Obama's score is calculated in accordance with the embodiments described herein by the weighted sum of a sub-score of representing the influence score of President Obama with respect to each publisher or data source. As discussed, the tier of the publisher is taken into account, and thus, President Obama's influence score will be significantly weighted towards the sub-scores from the higher tier publishers.

Influence scores may also be calculated differently for opinions of an influencer that are extracted from Twitter, or other social network sites such as Facebook, G+, or other similar social network sites allowing one to express their opinion. The algorithm used to calculate an influence score based on opinions from Twitter or other social network sites is based on the probability that one influencer is influenced by another influencer. For example, the probability that one Twitter user is influenced by another Twitter user. Especially in the case of Twitter, citation events and interactions are in the form of "retweets", "mentions", and "replies" between different users of Twitter. Thus, the algorithm captures the probability that an individual traversing the network will arrive at a particular influencer by following chains of citation, such as retweets, mentions, and replies. Any influencer who is cited more often, by other more influential influencers, will have a higher influence score. Thus, each influencer that cites another, distributes their own influence score to those cited, thus increasing the score of the person cited.

Thus, for opinions from social networks, and for Twitter in particular, an influencer may be defined as the individual who expresses an opinion that is mentioned, replied to, or retweeted or forwarded. An influencee is defined as the one who mentions, replies, retweets or forwards an opinion of the influencer. The interaction for social networks is the actual retweet or forward, mention, or reply. For example, if a Twitter user with handle CrazyMan posts on Twitter: "I like @BarackObama's idea about supporting innovation", CrazyMan is the influencee, and @BarackObama is the influencer.

An influence score may be calculated using the following equation (4):

$$\text{score}(\text{influencer}_k) = \quad (4)$$
$$(1-d) + d * \sum_g^{\text{interaction}(g,k)} \text{score}(\text{influencer}_g)/\text{out-degree}(\text{influencer}_g)$$

In equation 4, influencer$_k$ denotes an influencer we want to measure the score for. score(influencer$_g$) is the score of influencer$_g$. out-degree(influencer$_g$) is the frequency of retweets, mentions, and replies of influencer$_g$. The |interaction(g,k)| denoted as the total number of interactions occurring between g and k. d is a damping factor. The purpose of the damping factor is to reflect the probabilistic decay of influence through interactions. Influence scores can be calculated using equation 4 iteratively. Firstly, we need to get the out-degree and in-degree information for each influencer. In the initial iteration, we assign all influence score the same score as uniform initial scores. In each iteration of score calculation, the score for each influencer is recalculated from the sum of the scores of individuals citing the influencer. Once a convergence is reached where the scores are stabilized between iterations, the algorithm ends, and the resulting influence score associated with the influencer is used as the score. For example, @BarackObama's influence score is calculated from the sum of the scores of the influencees who retweet/mention/reply to @BarackObama normalized by the number of influencees.

As discussed above, influence engine 110 is also configured to invoke a mapping feature to identify multiple influencers as the same common influencer. Based on this identification, a merged influence score may be calculated. Calculation of merged scores may be carried out using the following equation (5):

$$\text{score}(\text{influencer}_k) = \max(S) + \sum_{s=i, i \neq \text{argmax}(S)}^{|S|} s_i/|S|^\beta \quad (5)$$

max(S) is the highest score of all of the scores from influencers identified as the same person. β is a fixed weighting factor that determines how much score an influencer may receive from non-majority networks. |S| is the number of networks. For example, if Barack Obama has an influence score of 100 on the topic of healthcare solely based on news websites and blogs, and Mitt Romney has scores of 70 from news websites and blogs and 60 from tweets, it is inaccurate to say that Mitt Romney is more influential than Obama by summing 70+60 simply because Romney holds a Twitter account and has opinions. However, Mitt Romney's extra outlets for opinions should be taken into account.

The examples shown below demonstrate how merged scores are determined. In the examples, shown below, a β of 2 is assigned.

Example 1

Twitter based influence score: 100, News website based influence score: 50, Social Network based influence score: 70.
Total # of Networks: 3
Maximum Score: 100
Merged influence score=100+(50+70)/3^2=113.

Example 2

Twitter based influence score: 2, News website based influence score: 30
Total # of Networks: 2
Maximum Score: 30
Merged influence score=30+(2/2^2)=30.5

Example 3

Twitter based influence score: 100, News website based influence score: 100
Total # of Networks: 3
Maximum Score: 100
Merged influence score: 100+(100)/2^2=125

Once influence engine 110 has generated a score for each individual based on the selected topic, all of the influence scores may be provided to the user that selected the topic. The influence scores may be provided as a list including corresponding influencer details and influence scores. The user may be any user that may utilize the influence scores to determine which influencers are most influential with respect to the selected topic.

Influence gap score is a score representing the total influence of a topic. Influence gap score can be calculated by equation 6.

$$influencegapscore(t) = \sum_{s}^{|S|} s, s \in t$$

t is a topic, s is an influence score from topic t. |S| denotes as the total number of influence scores in topic t. One usage of the influence gap score is to help people monitor and compare the influence activities of their topics different over time or with other topics. For example, a company might define a topic to track one of its products. It can then react appropriately to changes in the product's influence gap score over time, perhaps by targeting appropriate influencers or sources with additional messaging.

For example, if a company wanted to ascertain their brand awareness, it would be useful for the company to determine key influencers that either had many positive or many negative opinions about the company. With this information, the company could formulate new strategies for brand awareness and also know which individuals or types of individuals to target.

Influence engine 110 may host a user interface that can be provided to a user device 102 in order to provide the influence scores and corresponding influencers to the user of user device 102. Additionally, the user interface may provide additional functionality that allows the user of user device 102 to set their selected topic from which opinions are gathered to determine the influencers and calculate the influence scores, and also provide additional features allowing a user of user device 102 to ascertain more information about certain influencers.

Although not shown, any number of opinion extraction engines 106 and influence engines 110 may be a part of a backend of any web server capable of communication across a network such as network 112 to communicate with user devices 102 and content sources 104. Thus, in this embodiment, any communication with the opinion extraction engine 106 and influence engine 110 is via the web server that provides the services of opinion extraction engine 106 and influence engine 110 on its backend.

Figure 2:
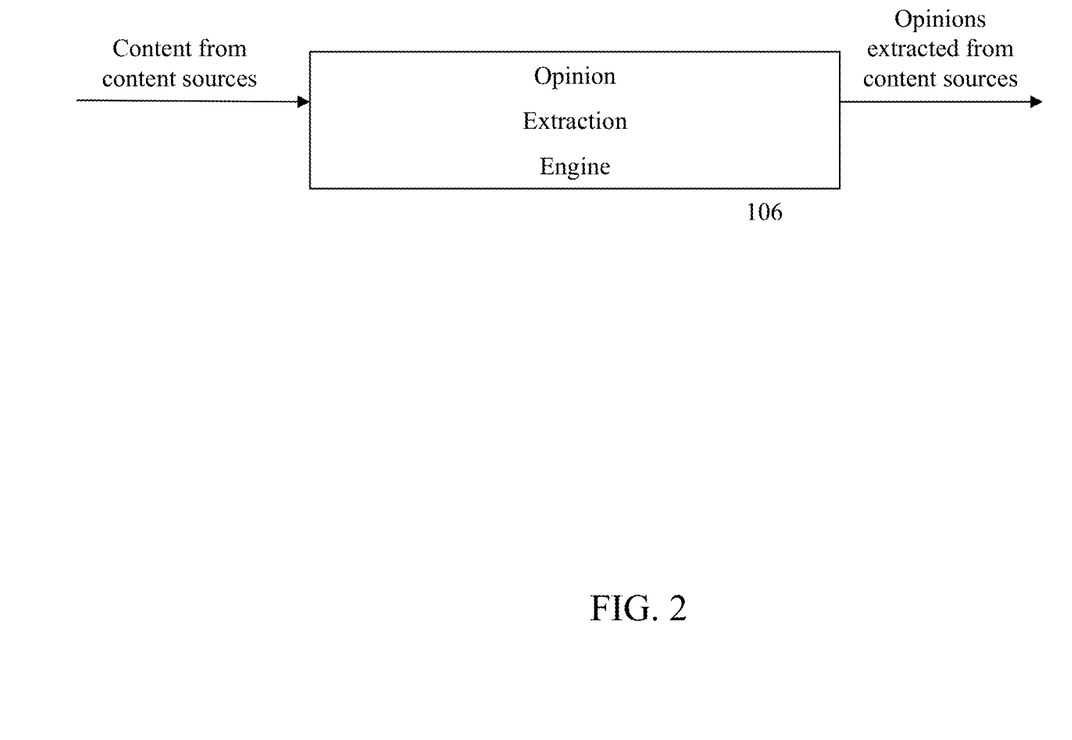
FIG. 2 illustrates inputs and outputs of an exemplary opinion extraction engine, in accordance with an embodiment of the present disclosure.

FIG. 2 illustrates inputs and outputs of an exemplary opinion extraction engine, in accordance with an embodiment of the present disclosure. Opinion extraction engine 106, as shown receives as input, content or data from content sources 104. As described above, this content is analyzed such that opinions are extracted Various attributes are also extracted, such as opinion holder, author, publisher, and publish date of each opinion. The opinions extracted may then be provided as output to influence engine 110.

Figure 3:
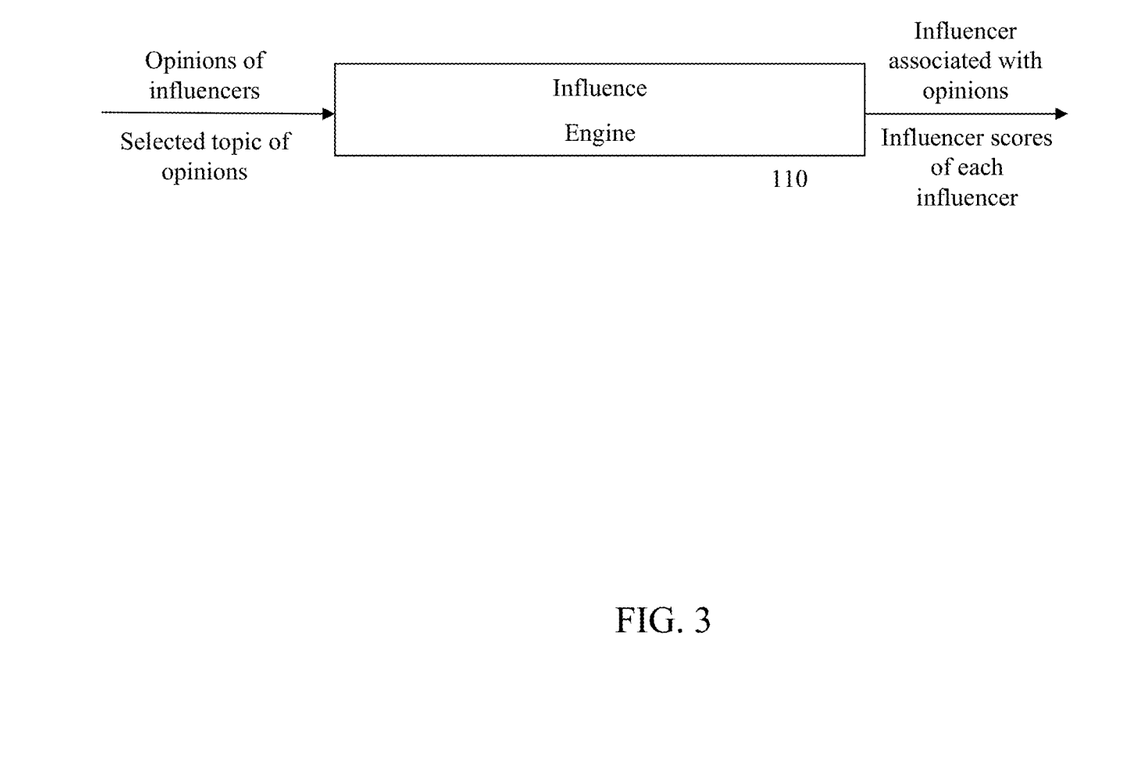
FIG. 3 illustrates inputs and outputs of an exemplary influence engine, in accordance with an embodiment of the present disclosure.

FIG. 3 illustrates inputs and outputs of an exemplary influence engine, in accordance with an embodiment of the present disclosure. Influence engine 110, as shown, receives as input, the opinions of influencers that are extracted by opinion extraction engine 106, as well as a selected topic of opinions to be used as a basis for generating influence scores. Influence engine 110 uses the opinions and the selected topic to first determine influencers, and then calculate influence scores for each influencer, as described above. The output from influence engine 110 comprises influencer names that are associated with various opinions, and influence scores that are calculated for each influencer. In certain circumstances, multiple influencers may represent the same common influencer, and thus, influence engine 110 will map the scores of the multiple influencers to the same influencer.

Figure 4:
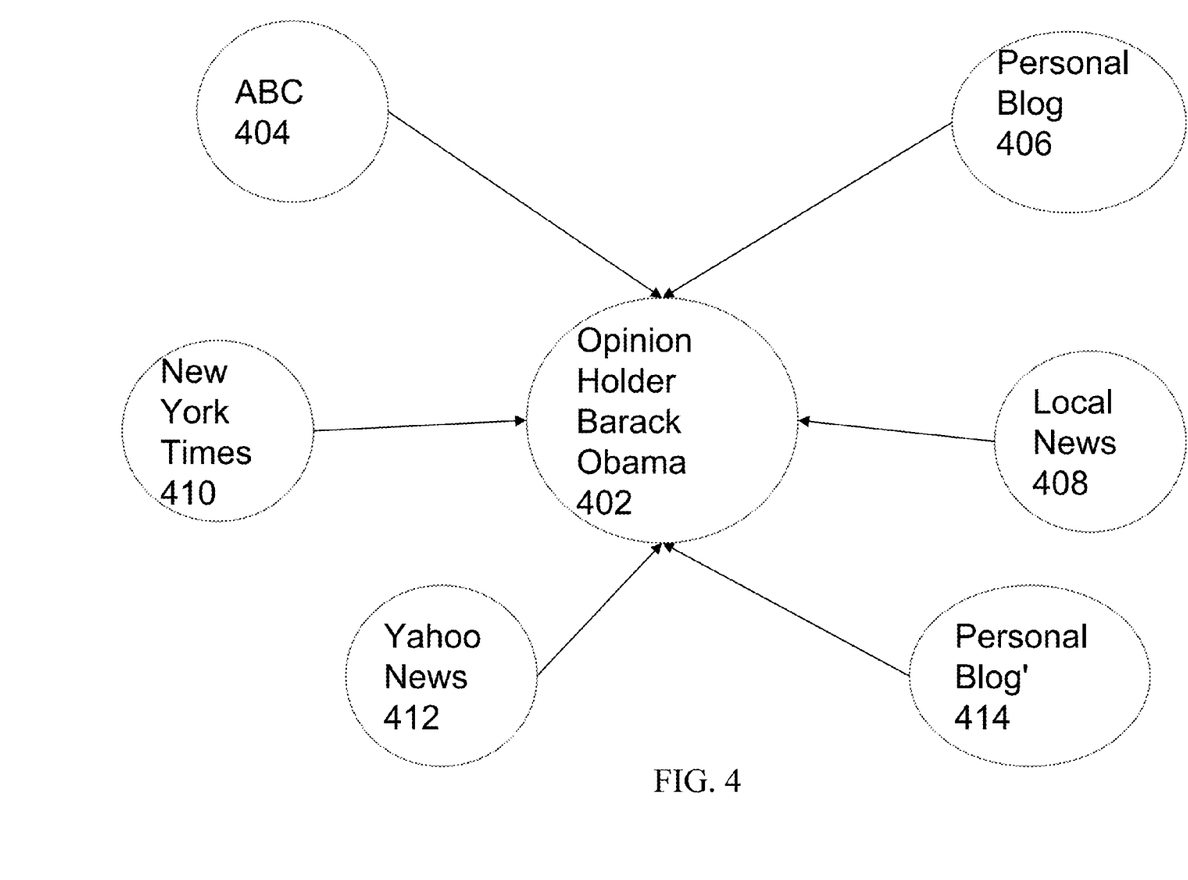
FIG. 4 illustrates an exemplary mapping of an influencer with various data or opinion sources, in accordance with an embodiment of the present disclosure.

FIG. 4 illustrates an exemplary mapping of an influencer with various data or opinion sources, in accordance with an embodiment of the present disclosure. FIG. 4 illustrates an opinion holder, Obama 402, which represents an influencer. The other circles all represent possible data sources from which opinions can be gathered. Circle 404 represents ABC which may be a news website, Circle 406 represents a personal blog, circle 408 represents a local news website, circle 410 represents the New York Times, circle 412 represents Yahoo! News, and circle 414 represents another personal blog. While the embodiments described herein have been described with respect to data or content sources that are accessed through the Internet, the data or content sources may also include traditional print media sources to the extent that any of the content from these traditional media sources has been archived or uploaded such that they are accessible through the Internet. For example, the New York Times website may contain an archive of publications from the 1990s which were not previously provided on the website. However, as these publications are archived and accessible through the Internet, any opinions from these archived publications may be retrieved by opinion extraction engine 106 to extract opinions to provide them to influence engine 110.

Figure 5:
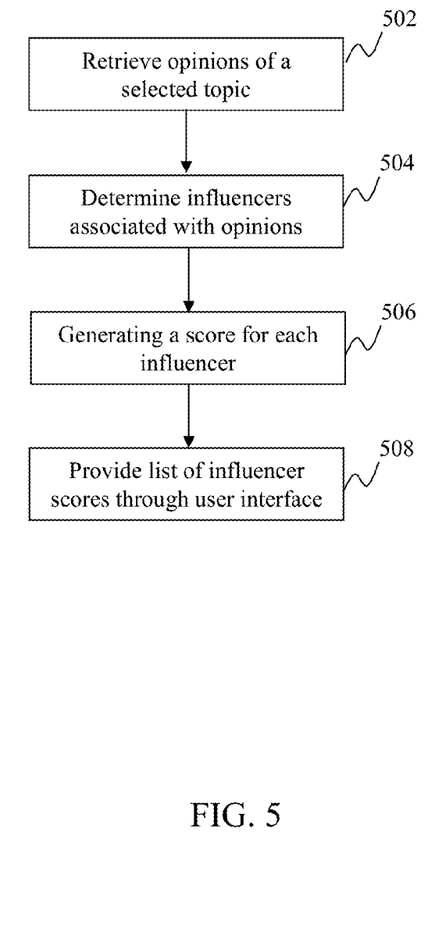
FIG. 5 illustrates an exemplary process for generating influence scores, in accordance with an embodiment of the present disclosure.

FIG. 5 illustrates an exemplary process for generating influence scores, in accordance with an embodiment of the present disclosure. The exemplary process illustrated by FIG. 5 may be carried out by influence engine 110. Influence engine 110 may be a component of a computer or a processor. The processor may be coupled to a display and storage. At 502, opinions of a selected topic are retrieved. The opinions may be retrieved from an opinion extraction engine 106 based on the selected topic. Opinion extraction engine 106, like influence engine 110, may also be a computer or a processor. The topic may be selected by a user, and the topic selection can be accompanied by a set of constraints that further define the selected topic. For example, a selected topic may be vacation rentals, and an accompanying constraint may be the region of North America, and thus only opinions regarding North American vacation rentals will be retrieved. The opinions are extracted from data sources such as news sites, blogs, tweets, comments, quotes, and social network entries from social network sites. Selection of the topic may take place via a user interface that provides a display allowing entry of the topic. Entry of the topic results in storage of information related to the topic in a database which may subsequently be retrieved by influence engine 110 or opinion extraction engine 110 to retrieve opinions.

At 504, influencers associated with the opinions are determined. Determination of influencers may be performed by influence engine 110 by analyzing the opinions to determine which are associated with particular influencers. In the event that at least two influencers are identified that may be the same entity or common influencer, the opinions of these influencers are mapped to the common influencer so that when the influence score is calculated, there will be a single merged influence score.

At 506, a score is generated for each influencer. Generation of the score may be based on interactions by each influencer with associated entities. Thus, these interactions must be determined. An example of an interaction is an influencer who interacts with a particular news website or blog to provide an opinion. Thus, the higher the quality and number of interactions between the influencer and the influencee, the higher the score of the influencer. The influencee itself may on some occasions have a score that is generated, and thus this is also taken into account in calculating the score. Calculation of the influence score is also based on a weighted score of each influencer with respect to a data source. Weighting of scores is based on what the particular data or content source is, for example, new websites or blogs or tweets from users of Twitter. This results in calculations of sub-scores for a particular influencer based on each different content source with opinions for the influencer. These sub-scores are then summed together based on a weighting of each sub-score.

At 508, a list of influence scores with corresponding influencer names is provided to a user of a device through a user interface. The user interface additionally may allow the user to select topics and set constraints for influence engine 110 to generate influence scores. The user interface may also be configured to provide additional information to the user about particular influencers and present the list of influence scores in different formats at the direction of the user. The user interface may reside at a user machine or reside at a machine networked with influence engine 110 and be accessible from a user machine. The list of influence scores and influencer names may be stored at a database for retrieval via the user interface based on the aforementioned steps of the process illustrated by FIG. 5 which are carried out by influence engine 110, or a computer or a processor embodying influence engine 110.

Figure 6:
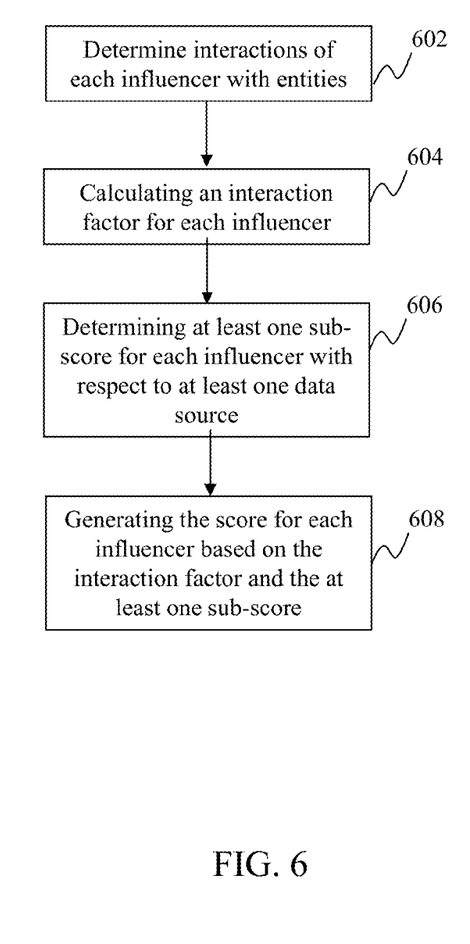
FIG. 6 illustrates an exemplary process for generating influence scores, in accordance with an embodiment of the present disclosure.

FIG. 6 illustrates an exemplary process for generating influence scores, in accordance with an embodiment of the present disclosure. At 602, interactions of each influencer with different entities is determined by influence engine 110. Influence engine 110 may be a component of a computer or a processor. The processor may be coupled to a display and storage. The other entities may be other influencers or influencees, each having their own influence score. Interactions between an influencer and other entity may comprise situations where the other entity cites an opinion of the influencer, or forwards, or expresses support for the opinion of the influencer. At 604, an interaction factor is calculated to take into account the amount of interactions with other entities, as well as take into account the influence scores of the other entities. At 606, sub-scores for each influencer with respect to at least one data source are determined. The at least data source may comprise different forms of sources from which opinions are gathered, such as news websites, Twitter, other social networks, or blogs. Thus, each discrete data source corresponds with its own sub-score for each particular influencer. At 608, the final influence score for each influencer is generated based on the interaction factor and the sub-scores. Generation of the scores is explained above at least with respect to Equations 1, 2, 3, and 4, which detail how the interaction factor and various sub-scores are used to arrive at a final influence score for any particular influencer. The final influence score for each influencer may be stored at a database for later retrieval via a user interface. The user interface may also be configured to provide additional information to the user about particular influencers and present the list of influence scores in different formats at the direction of the user. The user interface may reside at a user machine or reside at a machine networked with influence engine 110 and be accessible from a user machine. The list of influence scores and influencer names may be stored at a database for retrieval via the user interface based on the aforementioned steps of the process illustrated by FIG. 5 which are carried out by influence engine 110, or a computer or a processor embodying influence engine 110.

Figure 7:
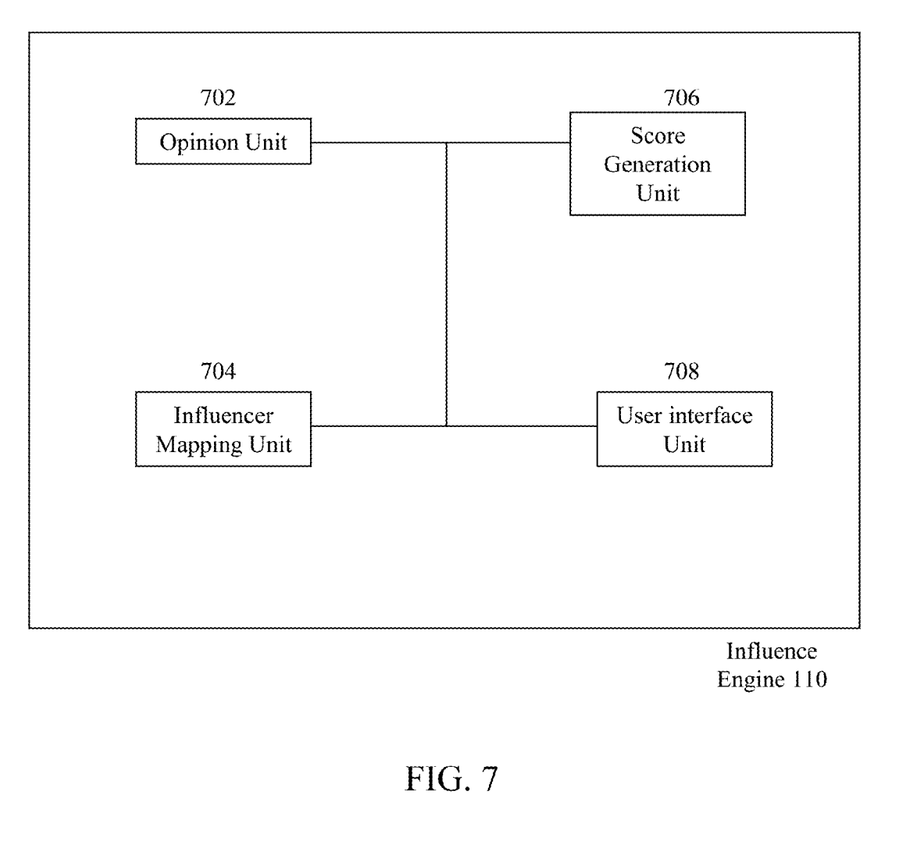
FIG. 7 illustrates an exemplary influence engine, in accordance with an embodiment of the present disclosure.

FIG. 7 illustrates an exemplary influence engine, in accordance with an embodiment of the present disclosure. Influence engine 110, as depicted by FIG. 7, shows the various components which may be a part of influence engine 110 to carry out the determination of influence scores and the generation of influence scores. Influence engine 110, as depicted, comprises an opinion unit 702, influencer mapping unit 704, score generation unit 706, and user interface unit 708. Opinion unit 702 is configured for retrieving opinions. The opinions are retrieved from opinion extraction engine 106 (not shown), and retrieval is based on a selected topic. The selected topic may be selected by a user via a user interface provided by user interface unit 708. Through the user interface, the user selects a topic for opinions, including other constraints which may further define the topic. Once selected, the selected topic and constraints are provided by user interface unit 708 to opinion unit 702 such that opinion unit 702 requests the opinions corresponding to the selected topic and constraints from opinion extraction engine 106.

Influencer mapping unit 704 is configured for determining influencers each associated with at least one opinion of the extracted opinions. The opinions may be analyzed to determine those associated with a particular influencer. In the event that there are two or more influencers that are actually the same entity or are a common influencer, influencer mapping unit 704 by way of a mapping feature, may associate the opinions of the two or more influencers with the common influencer such that when the influence score is calculated, all of a common influencer's names, alias', and nicknames are taken into account.

Score generation unit 706 is configured for generating a score for each influencer. The score is related to the selected topic as it is based only on opinions of the influencer regarding the selected topic. Calculation of the score, as described above, is based upon interactions by the influencer with other different entities. It is also based on what data source the opinions originate from, and thus calculation of the score may be weighted based upon a weighting assigned to each data source. Further description of score calculations is described above at least with respect to Equations 1, 2, 3, and 4.

User interface unit 708 is configured for providing the influence scores and influencer names to the user that selected the selected topic. User interface unit 708 provides this information through the aforementioned user interface.

Figure 8:
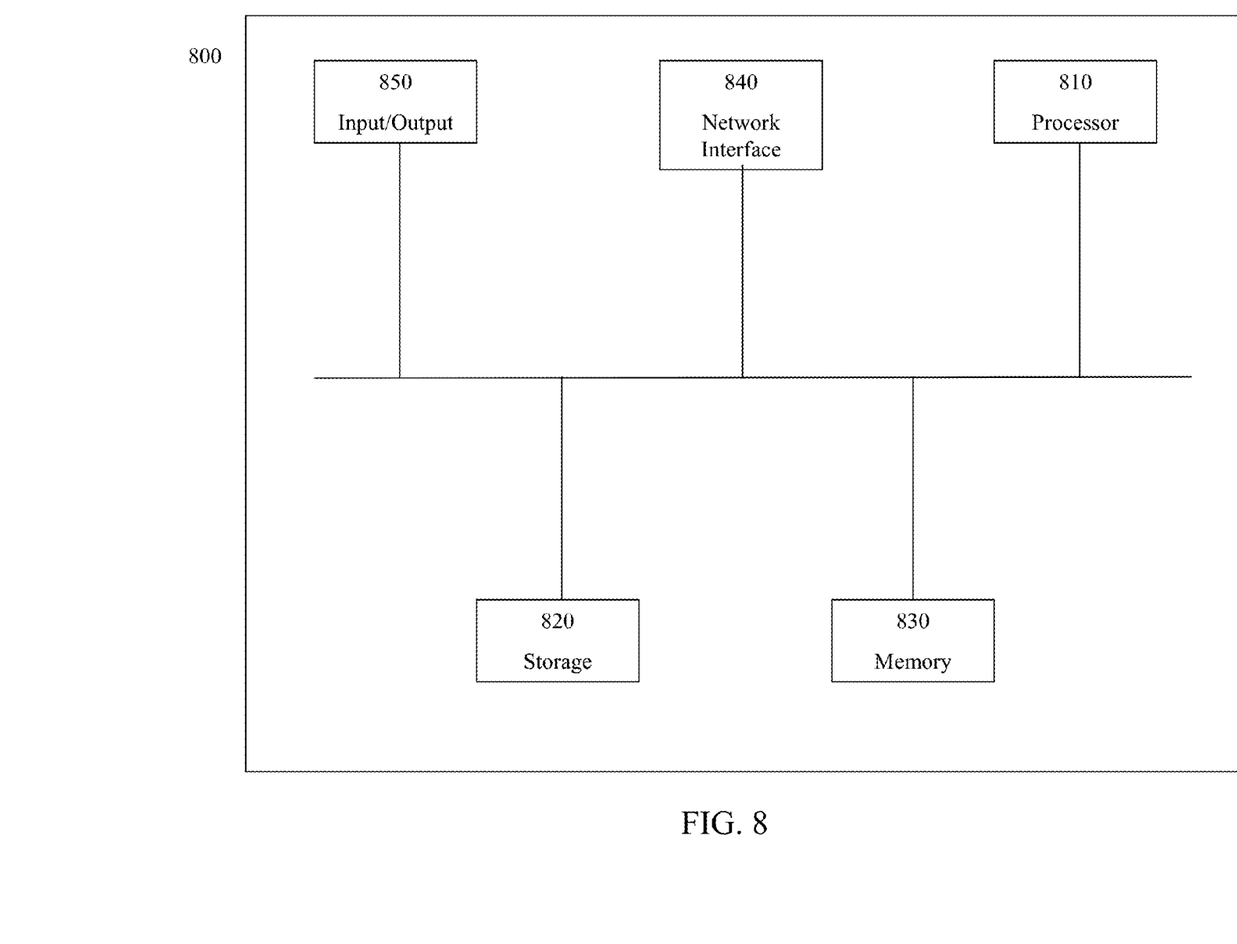
FIG. 8 illustrates a general machine architecture on which the present embodiments can be implemented and has a functional block diagram illustration of a hardware platform which includes user interface elements.

The above-described embodiments for collecting and analyzing application usage can be implemented on a computer using well-known computer processors, memory units, storage devices, computer software, and other components. A high-level block diagram of such a computer is illustrated in FIG. 8. Computer 800 contains ns a processor 810, which controls the overall operation of the computer 800 by executing computer program instructions, which define such operations. The computer program instructions may be stored in a storage device 820, or other computer readable medium (e.g., magnetic disk, CD ROM, etc.), and loaded into memory 830 when execution of the computer program instructions is desired. Thus, any of the processes described herein can be defined by the computer program instructions stored in the memory 830 and/or storage 820 and controlled by the processor 810 executing the computer program instructions. For example, the computer program instructions can be implemented as computer executable code programmed by one skilled in the art to determine influencers and generate influence scores. Accordingly, by executing the computer program instructions, the processor 810 executes an algorithm for generating influence scores as described herein. Computer 800 may also perform other functionalities, such as those described above in connection with all FIGS. corresponding to the embodiments described herein. The computer 800 also includes one or more network interfaces 840 for communicating with other devices via a network. The computer 800 also includes input/output devices 850 that enable user interaction with the computer 800 (e.g., display, keyboard, mouse, speakers, buttons, etc.) One skilled in the art will recognize that an implementation of an actual computer could contain other components as well, and that FIG. 8 is a high level representation of some of the components of such a computer for illustrative purposes.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim and all applications, modifications and variations that fall within the true scope of the present teachings.

The invention claimed is:

1. A method implemented using a processor and a database, comprising:
   retrieving a plurality of opinions of a selected topic from the database;
   determining an influencer based on at least one threshold parameter, using the processor, the influencer associated with at least one opinion from the plurality of opinions, wherein the threshold parameter corresponds to at least one of a quantitative or qualitative factor associated with the at least one opinion to which the influencer is associated; and
   automatically generating an influence score for the influencer using the processor, the influence score related to the selected topic;
   wherein the influence score is determined based on a weighted score of the influencer with respect to two or more of an interaction factor, a data source factor, or a data source diversity factor, wherein the interaction factor is determined based on a quantity of interactions between the influencer and one or more other entities and a level of an influencer score for each of the one or more other entities with whom the influencer interacts, wherein the data source factor is determined based on a value of each of one or more sources of the at least one opinion with which the influencer is associated, and wherein the data source diversity factor is determined based on a quantity of references to the influencer by each of the one or more sources of the at least one opinion with which the influencer is associated.

2. The method of claim 1, wherein retrieving a plurality of opinions of a selected topic comprises:
   extracting opinions from data sources.

3. The method of claim 2, wherein the data sources comprise at least one of: news sites, blogs, forums, transcripts, tweets, comments, quotes, or social network entries.

4. The method of claim 1, wherein determining the influencer comprises:
   analyzing the plurality of opinions to determine each of the at least one opinion generated by or about the influencer; and
   associating each of the at least one opinion generated by or about the influencer with the influencer.

5. The method of claim 1, further comprising:
   receiving the selected topic including a set of constraints relating thereto.

6. The method of claim 5, wherein the set of constraints includes at least one of: keywords, date limits, definitions, or product types.

7. The method of claim 1, further comprising:
   providing for display, an identity of the influencer including the corresponding influence score of the influencer with respect to the selected topic.

8. The method of claim 1, wherein generating the influence score for the influencer comprises:
   generating the influence score based on at least one of: quality of publications where the at least one opinion is found, a number of search engine hits for the at least one opinion, a number of mentions of the at least one opinion through social network entries, or diversity of sources for the at least one opinion.

9. The method of claim 1, wherein generating the influence score for the influencer comprises:

generating the influence score based on a plurality of weighted sub-scores.

10. The method of claim 9, wherein each of the weighted sub-scores is associated with a period of time, wherein a score associated with a shorter period of time has a lower weighting factor than a score associated with a longer period of time.

11. The method of claim 9, wherein each of the plurality of weighted sub-scores is based on at least one of a corresponding interaction factor, a corresponding data source factor, or a corresponding data source diversity factor.

12. The method of claim 1, wherein the influence score represents a unified score based on a plurality of sub-scores each associated with one of the one or more sources of the at least one opinion with which the influencer is associated.

13. The method of claim 1, wherein retrieving a plurality of opinions of a selected topic from the database comprises:
retrieving a plurality of opinions associated with a predetermined time period.

14. The method of claim 13, wherein the predetermined time period is a range of 30 through 90 days.

15. The method of claim 1, further comprising:
automatically generating, based on the influence score related to the selected topic, at least one of: details relating to demographics, or details relating to data sources.

16. The method of claim 1, further comprising identifying at least two influencer identities that represent the same influencer; and associating the opinions associated with the at least two influencer identities with the influencer.

17. The method of claim 1, wherein the value of each of one or more sources of the at least one opinion with which the influencer is associated is based on at least one of a level of credibility of the source, a level of viewership of the source, or a type of source.

18. A system comprising:
a database,
a processor, and
an influence engine comprising:
an opinion unit configured for retrieving a plurality of opinions of a selected topic from the database;
an influencer mapping unit configured for determining an influencer based on at least one threshold parameter, the influencer associated with at least one opinion from the plurality of opinions, wherein the threshold parameter corresponds to at least one of a quantitative or qualitative factor associated with the at least one opinion to which the influencer is associated; and
a score generation unit configured for automatically generating an influence score for the influencer using the processor, the influence score related to the selected topic, wherein the influence score is determined based on a weighted score of the influencer with respect to two or more of an interaction factor, a data source factor, or a data source diversity factor, wherein the interaction factor is determined based on a quantity of interactions between the influencer and one or more other entities and a level of an influence score for each of the other one or more entities with whom the influencer interacts, wherein the data source factor is determined based on a value of each of one or more sources of the at least one opinion with which the influencer is associated, and wherein the data source diversity factor is determined based on a quantity of references to the influencer by each of the one or more sources of the at least one opinion with which the influencer is associated.

19. The system of claim 18, further comprising:
an opinion extraction engine configured for extracting opinions from data sources, wherein the extracted opinions may be provided to the opinion unit.

20. The system of claim 19, wherein the data sources comprise at least one of: news sites, blogs, forums, transcripts, tweets, comments, quotes, or social network entries.

21. The system of claim 19, wherein the set of constraints includes at least one of: keywords, date limits, queries, definitions, or product types.

22. The system of claim 18, wherein the influencer mapping unit is further configured for analyzing the plurality of opinions to determine each of the at least one opinion generated by or about the influencer; identifying at least two influencer identities that represent the influencer; and associating the opinions associated with the at least two influencer identities with the influencer.

23. The system of claim 18, further comprising:
a user interface unit configured for receiving the selected topic including a set of constraints relating thereto.

24. The system of claim 18, further comprising:
a user interface unit configured for providing for display an identity of the influencer including the corresponding score of the influencer with respect to the selected topic.

25. The system of claim 18, wherein the score generation unit is further configured for generating the influence score for the influencer based on at least one of: quality of publications where the at least one opinion is found, a number of search engine hits for the at least one opinion, a number of mentions of the at least one opinion through social network entries, or diversity of sources for the at least one opinion.

26. The system of claim 18, wherein the score generation unit is further configured for generating the influence score for the influencer based on a plurality of weighted sub-scores.

27. The system of claim 26, wherein each of the plurality of weighted sub-scores is based on a corresponding interaction factor, a corresponding data source factor, and a corresponding data source diversity factor.

28. The system of claim 18, wherein the influence score represents a unified score based on a plurality of sub-scores each associated with one of the one or more sources of the at least one opinion with which the influencer is associated.

29. The system of claim 18, wherein the opinion unit is further configured for retrieving a plurality of opinions associated with a predetermined time period.

30. The system of claim 29, wherein the predetermined time period is a range of 30 through 90 days.

31. The system of claim 18, further comprising:
a user interface unit configured for: automatically generating, based on the influence score related to the selected topic, at least one of: details relating to demographics, or details relating to data sources.

32. The system of claim 18, further comprising:
analyzing the plurality of opinions to determine each of the at least one opinion generated by or about the influencer; and
associating each of the at least one opinion generated by or about the influencer with the influencer.

33. The system of claim 18, wherein the value of each of one or more sources of the at least one opinion with which the influencer is associated is based on at least one of a level of credibility of the source, a level of viewership of the source, or a type of source.

34. A machine readable non-transitory and tangible medium having information recorded thereon, wherein the information, when read by the machine, causes the machine to:
   retrieve a plurality of opinions of a selected topic from a database;
   determine an influencer based on at least one threshold parameter, the influencer associated with at least one opinion from the plurality of opinions, wherein the threshold parameter corresponds to at least one of a quantitative or qualitative factor associated with the at least one opinion to which the influencer is associated; and
   automatically generate a score for the influencer using a processor, the score related to the selected topic, wherein the score is determined based on a weighted score of each influencer with respect to two or more of an interaction factor, a data source factor, or a data source diversity factor, wherein the interaction factor is determined based on a quantity of interactions between the influencer and one or more other entities and a level of a score for each of the one or more other entities with whom the influencer interacts, wherein the data source factor is determined based on a value of each of one or more sources of the at least one opinion with which the influencer is associated, and wherein the data source diversity factor is determined based on a quantity of references to the influencer by each of the one or more sources of the at least one opinion with which the influencer is associated.

35. The machine readable non-transitory and tangible medium of claim 34, wherein the information for retrieving a plurality of opinions of a selected topic, when read by the machine, causes the machine to:
   extract opinions from data sources.

36. The machine readable non-transitory and tangible medium of claim 34, wherein the data sources comprise at least one of: news sites, blogs, forums, transcripts, tweets, comments, quotes, or social network entries.

37. The machine readable non-transitory and tangible medium of claim 34, wherein the information for determining influencers each associated with at least one opinion, when read by the machine, causes the machine to:
   analyze the plurality of opinions to determine each of the at least one opinion generated by or about the influencer;
   identify at least one influencer identity that represent the influencer; and
   associate each of the at least one opinions generated by or about the influencer with the influencer.

38. The machine readable non-transitory and tangible medium of claim 34, wherein the information, when read by the machine, causes the machine to:
   receive the selected topic including a set of constraints relating thereto.

39. The machine readable non-transitory and tangible medium of claim 38, wherein the set of constraints includes at least one of: keywords, date limits, queries, definitions, or product types.

40. The machine readable non-transitory and tangible medium of claim 34, wherein the information, when read by the machine, causes the machine to:
   provide for display an identity of the influencer including the corresponding score of the influencer with respect to the selected topic.

41. The machine readable non-transitory and tangible medium of claim 34, wherein the information for generating a score for the influencer, when read by the machine, causes the machine to
   generate a score based on at least one of: quality of publications where the at least one opinion is found, a number of search engine hits for the at least one opinion, a number of mentions of the at least one opinion through social network entries, or diversity of sources for the at least one opinion.

42. The machine readable non-transitory and tangible medium of claim 34, wherein the information for generating a score for each influencer, when read by the machine, causes the machine to:
   generate a score based on a plurality of weighted sub-scores, each sub-score associated with a period of time, wherein a score associated with a shorter period of time has a lower weighting factor than a score associated with a longer period of time.

43. The machine readable non-transitory and tangible medium of claim 34, wherein the selected topic may represent at least one of: consumer goods, political issues, current events issues, and or brand names.

44. The machine readable non-transitory and tangible medium of claim 34, wherein the score represents a unified score based on a plurality of sub-scores each associated with one of the one or more sources of the at least one opinion with which the influencer is associated.

45. The machine readable non-transitory and tangible medium of claim 34, wherein the information for retrieving a plurality of opinions of a selected topic, when read by the machine, causes the machine to:
   retrieve a plurality of opinions associated with a predetermined time period.

46. The machine readable non-transitory and tangible medium of claim 45, wherein the predetermined time period is a range of 30 through 90 days.

47. The machine readable non-transitory and tangible medium of claim 34, wherein the information, when read by the machine, causes the machine to:
   automatically generate, based on the score related to the selected topic, at least one of: details relating to demographics, or details relating to data sources.

48. The machine readable non-transitory and tangible medium of claim 34, wherein the value of each of one or more sources of the at least one opinion with which the influencer is associated is based on at least one of a level of credibility of the source, a level of viewership of the source, or a type of source.

* * * * *